May 14, 1963 K. MÜLLER 3,089,249
GEAR CHECKING INSTRUMENT
Filed Sept. 8, 1959 4 Sheets-Sheet 1

FIG. I.

INVENTOR
KARL MÜLLER

By Wenderoth, Lind & Ponack
Attys.

INVENTOR
KARL MÜLLER

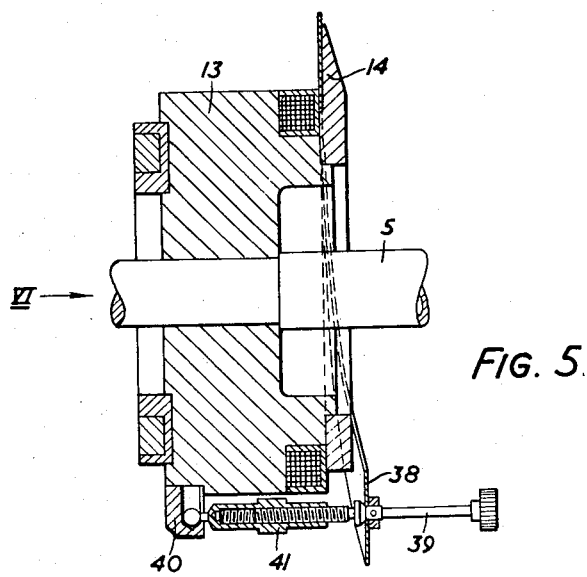
FIG. 5.
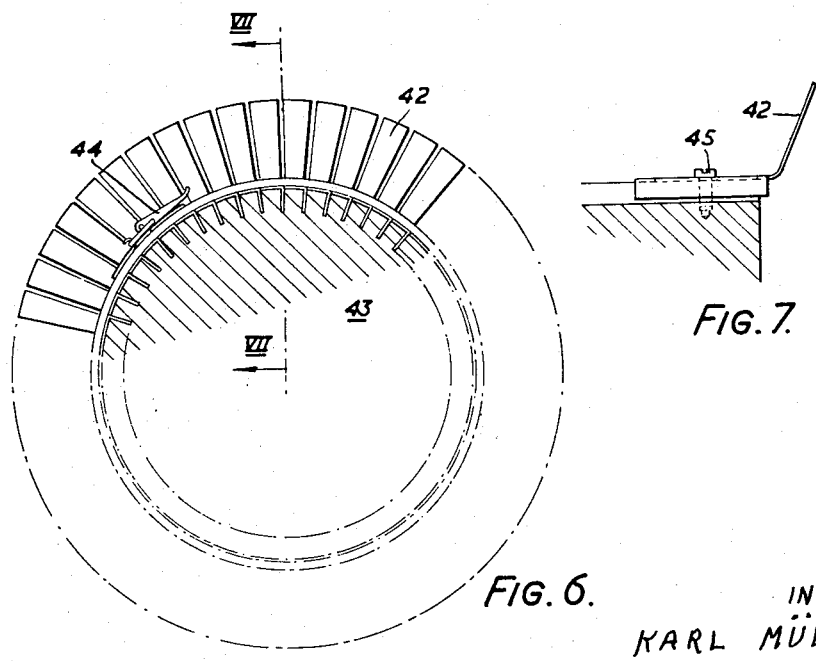
FIG. 7.
FIG. 6.
INVENTOR
KARL MÜLLER
By
Wenderoth, Lind & Ponack
Attys.

May 14, 1963 K. MÜLLER 3,089,249
GEAR CHECKING INSTRUMENT
Filed Sept. 8, 1959 4 Sheets-Sheet 4

INVENTOR
KARL MÜLLER
By
Wenderoth, Lind & Ponack
Attys.

United States Patent Office 3,089,249
Patented May 14, 1963

3,089,249
GEAR CHECKING INSTRUMENT
Karl Müller, Zurich, Switzerland, assignor to Maag Gear Wheel & Machine Company Limited, Zurich, Switzerland
Filed Sept. 8, 1959, Ser. No. 838,534
Claims priority, application Switzerland Sept. 11, 1958
9 Claims. (Cl. 33—179.5)

The invention relates to a gear checking instrument for measuring the distance of two flanks in a direction substantially along or parallel to the line of action of the gear.

Instruments of this kind have become known in which a fixed and a movable measuring jaw are provided as well as a counter-stop connected to the fixed jaw adjustably along the said line of action and contacting the workpiece, the said counter-stop being adjustably connected to the said fixed jaw also transversely of the said line of action, for example pivotally. Such an arrangement has been found particularly suitable for manually operated gear checking instruments.

The present invention has the primary object of providing a gear checking instrument capable of attaining also an automatic step off movement of the work piece after each measurement.

It is another object of the invention to dispense with the aforesaid counter-stop.

With these and other objects in view which will become apparent later from this specification and the accompanying drawings, I provide a gear checking instrument for measuring the distance of two tooth flanks from one another substantially in the direction of the line of action of the gear tested, comprising in combination: a base, a mandrel rotatably journalled on said base and in operation mounting the gear to be tested, a casing adjustably mounted on said base, a shaft rotatably journaled in said casing about an axis perpendicular to and passing the axis of said mandrel, two measuring jaws mounted on the said shaft so as to partake in the rotation thereof and in operation contacting the tooth flanks of the gear tested, at least one of the said jaws having a limited part of its circumference formed helically and when upon rotation contacting the gear tested, turning the same one pitch, one of the said measuring jaws being restrained axially and the other being slidable axially relative to the said shaft.

These and other features of my said invention will be clearly understood from the following description of a preferred embodiment thereof given by way of example with reference to the accompanying drawings, in which:

FIG. 5 is a vertical section of the rotatable shaft, particularly showing the axially immovable measuring jaw;

FIG. 6 is a section on the line VI—VI perpendicular to the axis of the rotatable shaft and a view of that measuring jaw only which has the partly helical circumference with adjustable individual elements in an embodiment modified from that of the preceding figures;

FIG. 7 is an axial section on the line VII—VII of FIG. 6 of an adjustable element.

Figure 1:
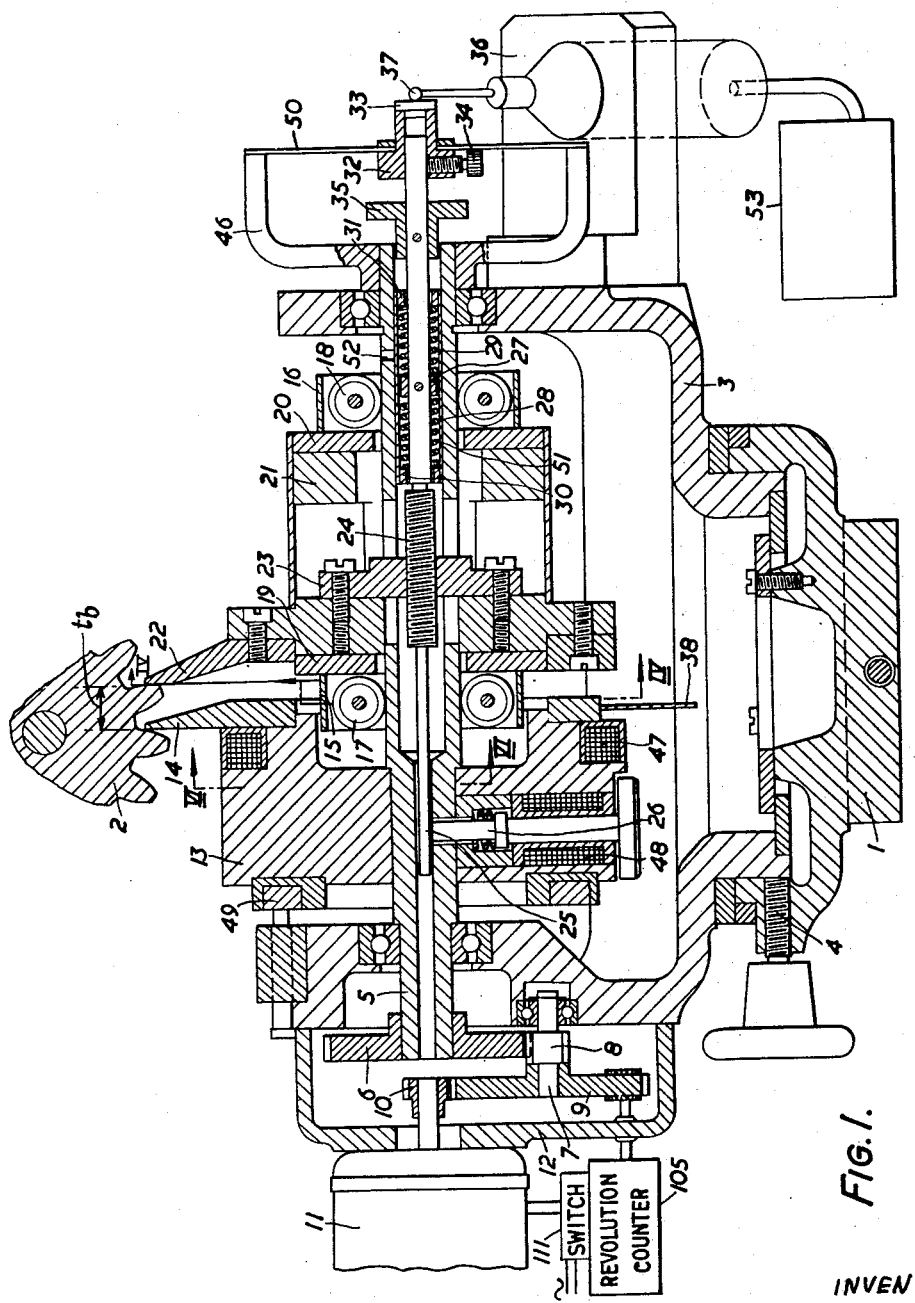
FIG. 1 is a horizontal section of the rotatable shaft with the two measuring jaws, this section extending also to the gear to be checked which has a vertical axis, and illustrating the measuring of the base pitch.

The support 1 (see FIG. 1) is mounted on the machine frame (not shown) of a gear checking instrument, a vertical adjustability likewise existing for adjustment in accordance with the shape of the gear 2 to be checked. The casing 3 is pivotal about a horizontal axis, and is adjusted in accordance with the helix angle of the toothing of the specimen 2 to be tested, and secured by means of a screw 4. In the casing 3 the shaft 5 is journalled rotatably. The same is driven by the gear 6, the pinion 8 mounted on the lay shaft 7, the gear 9 and the pinion 10 mounted on the motor shaft of the motor 11. The motor 11 is attached to the flange 12 of the casing 3.

On the rotatable shaft 5 a ring 13 is attached, on which the measuring jaw 14 is mounted. This measuring jaw is accordingly axially immovable with respect to the shaft 5. It is designed in annular shape but has the profile of a measuring jaw only over part of its circumference, while being helical over the remainder, the helical face being formed by a piece of sheet metal 38. The adjustment of the helical face is effected by adjustment screws 39 (FIG. 5) for different pitches of the workpieces. The adjustment screws 39 are held pivotally in a segment 40 by means of a ball joint nut 41.

On the shaft 5 there is mounted also an axially movable group consisting of the guide rings 15 and 16, each having four rollers 17 and 18, respectively, between which the flanges 19 and 20 with the carrier 21 are fixed, the measuring jaw 22 being fixed on the carrier 21 and being accordingly axially movable on the shaft 5.

The annular measuring jaw 22 is designed as a measuring jaw over the same limited range of its circumference as the measuring jaw 14.

The rollers 17 and 18 prevent any turning of the axially movable group in respect to the shaft 5 owing to the square profile of the latter in the range of the rollers 17 and 18. Moreover the shaft 5 is also provided with a slot through which extends a bar 23 fixedly connected to the carrier 21. Coaxially with the shaft 5 the bar 23 has a tapped hole engaged by a threaded spindle 24. Any movement of the axially movable measuring jaw 22 is accordingly imparted also to the spindle 24. The spindle 24 has an extension 25 which can be locked in the shaft 5 by means of a magnetically controllable clamping pin 26. This spindle 24 has a collar 27 and on both sides of said collar a spring 28 and 29, respectively, which abut each on a collar 30 and 31, respectively in the sleeve 51, this sleeve 51 being fixed in the shaft 5 by a grub screw 52, and which springs tend to hold the spindle 24 in a certain middle position. On the end of the spindle 24 an adjustable collar 32 and cap 33 are arranged which collar can be arrested on the spindle by means of a screw 34. The inner end position of the collar 32 is limited by a knurled abutment and turn knob 35. On the casing 3 a support 36 with a feeler 37 is attached, which feeler operates an indicator instrument 53 recording the axial movements of the spindle 24 transmitted to it by the said feeler 37. A yoke 46 protects the end of the spendle 24 and carries moreover a leaf spring 50, in which the spindle 24 is frictionless suspended at its right hand side end by means of the collar 32 and which in the middle position is substantially straight. This leaf spring 50 assists also the action of the two springs 28 and 29.

Figure 2:
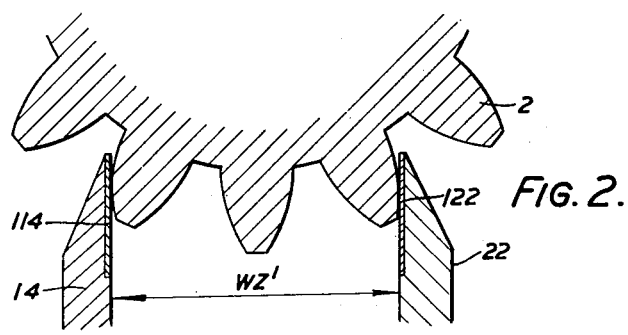
FIG. 2 shows the measuring of the base tangent length over several teeth.
Figure 3:
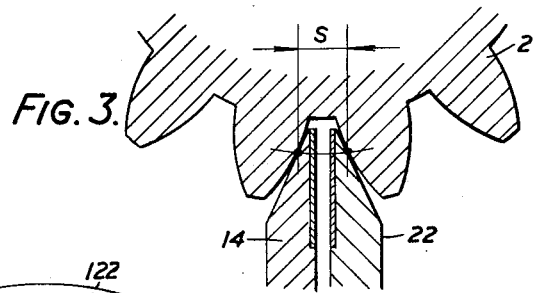
FIG. 3 shows the measuring of the gap between two teeth.
Figure 4:
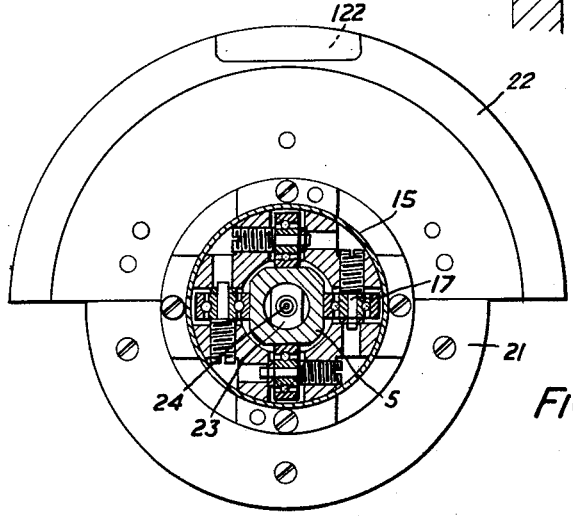
FIG. 4 is a vertical section of the rotatable shaft on the line IV—IV of FIG. 1.
Figure 8:
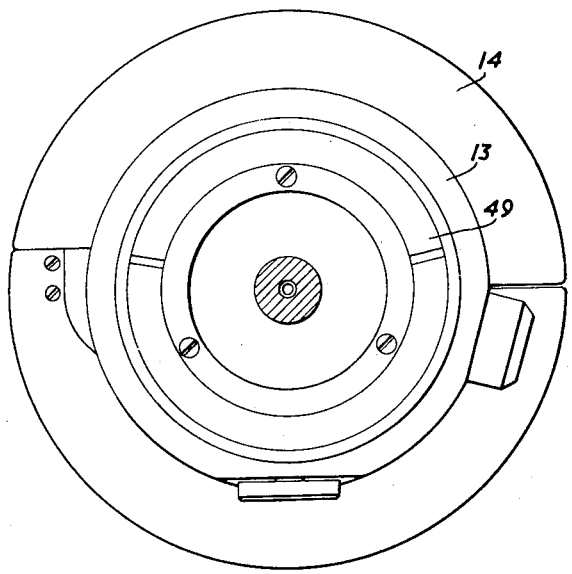
FIGS. 8 and 9 are two part-end elevations of details.
Figure 9:
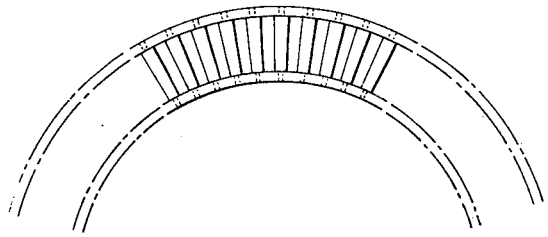

Moreover in FIG. 1 the measuring of the base pitch $t_b$ by the illustrated arrangement of the measuring jaws 14 and 22 is shown. In FIG. 2 the measuring of the base tangent length $W_z'$ over a certain number of teeth by means of a different arrangement of the measuring jaw 14 is illustrated. In FIG. 3 the measuring of the gap $s$ between two teeth by means of an arrangement of the measuring jaws on the ring 13 different from that of FIG. 2 and with the use of different measuring points on the two measuring jaws 14 and 22 is shown.

The helical design of the measuring jaw 14 or of the sheet metal piece 38, respectively, by the aid of adjustment screws 39 may alternatively be effected by the aid of adjustable individual segments 42 (FIGS. 6 and 7). The same are arranged on a ring 43 otherwise corresponding to the ring 13. These individual segments may be separately adjusted at different angles in accordance with the pitch of the gear 2 to be checked, and may be attached either as a whole by means of a strip fixture 44 (FIG. 6) or each individually by means of an associated screw 45 (FIG. 7) on the ring 43.

The functioning of the gear checking instrument according to the invention is as follows:

After fitting a gear 2 to be checked to the work holding spindle, the measuring zone of the measuring jaw 14 is brought into contact with the corresponding measuring zone of the tooth flanks of the gear tested, since the work holding spindle can be rotated easily. Moreover the electromagnet 47 on the ring 13 attracts the measuring zones on the tooth of the gear tested and on the measuring jaw 14 towards one another in order to secure a safe contact thereof. When dispensing with this electromagnet 47 the work holding spindle would have to be provided with a brake in order to secure the measuring contact pressure.

At a certain measuring position and a certain setting of the sleeve 51 there exists a specific measuring pressure on account of the spring tension of spring 29. A displacement of the measuring jaw 22 changes also the measuring pressure. In the event of as extensive change of the base pitch $t_b$ in another gear (FIG. 1) to be checked, the measuring pressure will also obtain undesired values. To adjust the spring pressure to a desired value of the measuring jaw 22 on the tooth flank to be checked, the sleeve 51 can be moved upon loosening of the grub screw 52, namely in that the desired measuring pressure is established on the flank of the gear tested through turning the abutment and turning knob 35 and thereafter through appropriately fixing the sleeve 51 by means of the grub screw 52. The position of the ring 32 on the rod 24 is appropriately fixed by loosening and resetting the screw in order to fix the position of the feeler 37 to the measuring surface of the measuring jaw 22 or to fix the new desired position of the flank to be tested respectively.

The sheet metal piece 38, or in the embodiment according to FIGS. 6 and 7 the individual segments, are adjusted helically in such a manner so that upon a certain rotation of the rotatable shaft 5 the workpiece 2 is rotated for one tooth similar to the transmission of the motion of one worm to a worm gear. The checking of the gear 2 clamped on is effected by setting the motor 11 in operation, which drives the shaft 5 continuously through the gearing 10, 9, 8 and 6. In the portion including the measuring zone of the measuring jaws 14 and 22 the transmission of the measured value is effected through the measuring jaw 22, carrier 21, bar 23, spindle 24, collar 32, cap 33, feeler 37 to the recording instrument 53 (FIG. 1). The measuring jaw is magnetized during this period.

When continuing the rotation of the shaft 5 beyond this zone the electromagnet 47 is switched off, and the electromagnet 48 is switched on shortly before leaving the measuring zone, so that the extension 25 of the spindle 24 is locked. In these conditions the stepping off of the pitch is effected, i.e. the moving on of the gear tested a pitch by the sheet metal piece 38. As soon as the measuring zone of the measuring jaws 14 and 22 is again reached the magnet 47 is switched on and the magnet 48' switched off, so that the measuring results of the next pitch are recorded. This switching on and off of the magnets is controlled by a slip ring-like interrupted contact disc 49 on the ring 13. In the embodiment described accordingly for each revolution of the rotatable shaft 5 an automatic measurement and moving on the gear tested one pitch is attained. In the usual manner the motor 11 may be brought to a standstill, when the shaft 5 has performed a number of revolutions corresponding to the number of teeth of the gear tested, say by means of a switch 111 controlling the circuit of the motor 11 and operated by a revolution counter 105 operatively connected to the shaft 5.

Apart from spur gears having straight toothing as illustrated in the drawings quite generally gears and articles having toothing-like profiles can be checked on the instrument according to the invention such as helical gears, toothed racks and cutter racks or bevel gears. It is also possible to use, instead of the measuring jaws rotating (for straight toothing) in a plane perpendicular to the axis of the workpiece, two semi-circular wobble plates, the measuring zone being thereby restricted to a point. This sort of wobble disc has the same effect as the helical formation of the measuring jaws. It is also convenient to provide the restricted measuring ranges with suitable inserts 114, 122, respectively, of hard metal in order to reduce the friction between the measuring zones; it may likewise be convenient to provide the helical portions of the measuring jaws for example with rollers.

What I claim as my invention and desire to secure by Letters Patent, is:

1. A gear checking instrument for measuring the distance of two tooth flanks from one another substantially in the direction of the line of action of a gear to be tested, comprising in combination a base, a mandrel rotatably journalled on said base for mounting the gear to be tested, a casing adjustably mounted on said base, a shaft rotatably journalled in said casing about an axis perpendicular to the axis of said mandrel, two measuring jaws mounted on said shaft and rotating therewith for contacting the tooth flanks of said gear, one of said jaws having a circumferential helical portion contacting said gear, said helical portion being sufficient in extent to displace said gear at least one tooth per revolution, one of said measuring jaws being restrained axially and the other being slidable axially relative to said shaft and means for measuring the relative axial displacement of said jaws.

2. A gear checking instrument as claimed in claim 1, wherein said axially restrained measuring jaw is the one having said helical portion.

3. A gear checking instrument as claimed in claim 1, comprising indicator means operatively connected to said axially slidable measuring jaw.

4. A gear checking instrument for measuring the distance of two tooth flanks from one another substantially in the direction of the line of action of a gear to be tested, comprising in combination a base, a mandrel rotatably journalled on said base for mounting the gear to be tested, a casing adjustably mounted on said base, a shaft rotatably journalled in said casing about an axis perpendicular to the axis of said mandrel, two measuring jaws mounted on said shaft and rotating therewith for contacting the tooth flanks of said gear, a sheet metal of helical shape occupying part of the circumference of at least one of the said jaws, adjustment screws engaging said sheet metal and adjusting its helix angle when operated, said helical sheet metal upon rotation contacting said gear and displacing the same one pitch, one of said measuring jaws being restrained axially and the other being slidable axially relative to the said shaft and means for measuring the relative axial displacement of said jaws.

5. A gear checking instrument as claimed in claim 4, wherein said sheet metal is subdivided into individual segments having a separate adjustment screw for each of said segments.

6. A gear checking instrument for measuring the distance of two tooth flanks from one another substantially in the direction of the line of action of a gear to be tested, comprising in combination a base, a mandrel rotatably journalled on said base for mounting the gear to be tested, a casing adjustably mounted on said base, a shaft rotatably journalled in said casing about an axis perpendicular to the axis of said mandrel, two measuring jaws mounted on said shaft and rotating therewith for contacting the tooth flanks of said gear, one of said jaws having a circumferential helical portion contacting said gear, said helical portion being sufficient in extent to displace said gear at least one tooth per revolution, one of said measuring jaws being restrained axially and the other being slidable axially relative to said shaft, electromagnetic means when energised forcing one of said measuring jaws into contact with a flank of said gear and means for measuring the relative axial displacement of said jaws.

7. A gear checking instrument according to claim 6 comprising locking means for locking said two measuring jaws to one another during the movement through one pitch of said gear by contact with said helical portion.

8. A gear checking instrument as claimed in claim 7, comprising electromagnetic control means operating said locking means.

9. A gear checking instrument for measuring the distance of two tooth flanks from one another substantially in the direction of the line of action of a gear to be tested, comprising in combination a base, a mandrel rotatably journalled on said base for mounting the gear to be tested, a casing adjustably mounted on said base, a shaft rotatably journalled in said casing about an axis perpendicular to the axis of said mandrel, two measuring jaws mounted on said shaft and rotating therewith for contacting the tooth flanks of said gear, one of said jaws having a circumferential helical portion contacting said gear, said helical portion being sufficient in extent to displace said gear at least one tooth per revolution, one of said measuring jaws being restrained axially and the other being slidable axially relative to said shaft, said measuring jaws being asymmetrical about a plane perpendicular to their axis of rotation and being reversible relative to said rotatable shaft for performing different measuring operations and means for measuring the relative axial displacement of said jaws.

References Cited in the file of this patent

UNITED STATES PATENTS

| | | |
|---|---|---|
| 1,551,671 | Kaufman | Sept. 1, 1925 |
| 1,651,159 | Schurr | Nov. 29, 1927 |
| 2,287,677 | Fraumann | June 23, 1942 |
| 2,318,970 | Richmond | May 11, 1943 |